(12) United States Patent
Ono

(10) Patent No.: US 12,381,451 B2
(45) Date of Patent: Aug. 5, 2025

(54) CONTROL DEVICE FOR POWER GENERATION DEVICE

(71) Applicant: NTN CORPORATION, Osaka (JP)

(72) Inventor: Kouhei Ono, Kuwana (JP)

(73) Assignee: NTN CORPORATION, Osaka (JP)

(*) Notice: Subject to any disclaimer, the term of this patent is extended or adjusted under 35 U.S.C. 154(b) by 0 days.

(21) Appl. No.: 17/909,934

(22) PCT Filed: Feb. 16, 2021

(86) PCT No.: PCT/JP2021/005640
§ 371 (c)(1),
(2) Date: Sep. 7, 2022

(87) PCT Pub. No.: WO2021/182029
PCT Pub. Date: Sep. 16, 2021

(65) Prior Publication Data
US 2024/0204616 A1   Jun. 20, 2024

(30) Foreign Application Priority Data

Mar. 9, 2020   (JP) .................... 2020-039694

(51) Int. Cl.
*H02K 7/18* (2006.01)
*H02K 7/102* (2006.01)
*H02K 11/30* (2016.01)

(52) U.S. Cl.
CPC ........... *H02K 7/1823* (2013.01); *H02K 7/102* (2013.01); *H02K 11/30* (2016.01)

(58) Field of Classification Search
CPC ....... H02K 7/1823; H02K 11/30; H02K 7/102
See application file for complete search history.

(56) References Cited

U.S. PATENT DOCUMENTS

2006/0119105 A1   6/2006   Kang et al.
2007/0216163 A1   9/2007   Guang et al.
(Continued)

FOREIGN PATENT DOCUMENTS

JP   2002-136192 A   5/2002
JP   2006-296189 A   10/2006
(Continued)

OTHER PUBLICATIONS

International Search Report received in PCT Application No. PCT/JP2021/005640, dated May 11, 2021, with English translation.

*Primary Examiner* — Viet P Nguyen
(74) *Attorney, Agent, or Firm* — Rimon P.C.

(57) ABSTRACT

A power generation system includes a wind power generation device, a control device, and a power supply target. In power generation system, control device performs power conversion to a power generated by wind power generation device, and supplies the converted power to a power supply target. Control device has a reference map for controlling a power conversion device of the control device. Reference map is a map indicating a relationship between an input voltage to the control device (power conversion device) and an output power from the control device (power conversion device). When a start condition is satisfied, control device executes correction control for correcting reference map, and searches for a point at which an output power of power generation system is maximized while shifting the output voltage of a generator by MPPT control. Control device corrects reference map on the basis of a result of the search.

10 Claims, 9 Drawing Sheets

(56) References Cited

U.S. PATENT DOCUMENTS

2014/0169055 A1    6/2014  Forage
2017/0126142 A1*   5/2017  Toujinbara ........ H02M 7/53875
2019/0195189 A1*   6/2019  Echenique Subiabre ...................
                                                         F03B 15/00

FOREIGN PATENT DOCUMENTS

JP        2017093028 A      5/2017
WO     WO-2017220994 A1 *  12/2017   .............. F03B 15/00
WO        2019/049502 A1    3/2019
WO        2019/208728 A1   10/2019

* cited by examiner

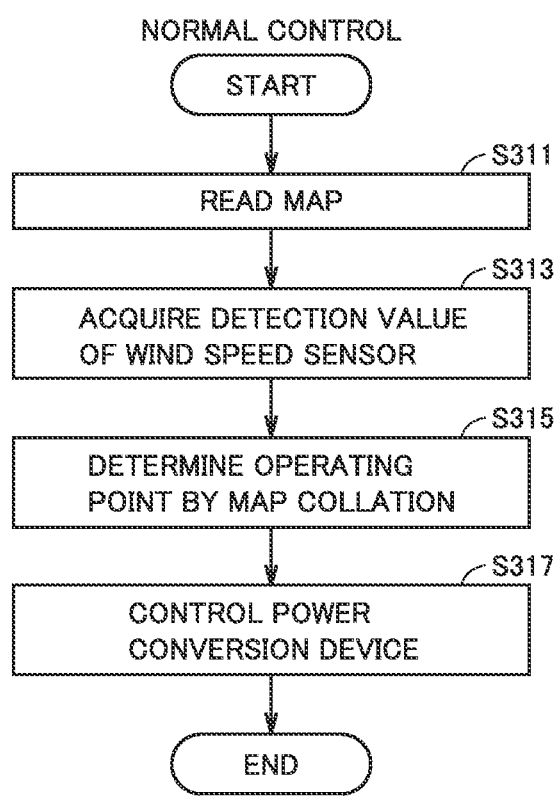

CONTROL DEVICE FOR POWER GENERATION DEVICE

CROSS-REFERENCE OF RELATED APPLICATIONS

This application is the U.S. National Phase under 35 U.S.C. § 371 of International Patent Application No. PCT/JP2021/005640, filed on Feb. 16, 2021, which in turn claims the benefit of Japanese Application No. 2020-039694, filed on Mar. 9, 2020, the entire disclosures of which Applications are incorporated by reference herein.

TECHNICAL FIELD

This invention relates to a control device for a power generation device that converts rotational energy of a rotating body configured of a windmill or a waterwheel into electric energy.

BACKGROUND ART

A power generation device using wind power or hydraulic power is known. For example, Japanese Patent Laying-Open No. 2006-296189 (PTL 1) discloses a wind power generation device that converts rotational energy of a windmill into electric energy by a generator connected to a main shaft of the windmill, performs power conversion to an output power of the generator, and outputs the power to a power supply target such as a grid. This wind power generation device is adapted to have a map indicating a relationship between a number of rotations of the windmill (generator) and output characteristics, and control the generator on the basis of a predetermined torque command pattern to thereby obtain a desired output power.

CITATION LIST

Patent Literature

PTL 1: Japanese Patent Laying-Open No. 2006-296189

SUMMARY OF INVENTION

Technical Problem

The output characteristics of the wind power generation device may vary, depending on an environment of a location where the wind power generation device is installed. Therefore, in a case where maximum efficiency is to be exhibited by the wind power generation device by the control according to the map, there is a possibility that in some location where the wind power generation device is installed, the wind power generation device does not exhibit the maximum efficiency. In the wind power generation device disclosed in PTL 1, no consideration is given to variation in output characteristics depending on the environment of the installation location of the wind power generation device. A hydraulic power generation device structurally similar to the wind power generation device may also have the same problem as described above.

The present invention has been made to solve the above problem, and an object of the present invention is to provide a control device capable of controlling a power generation device to exhibit maximum efficiency in accordance with an environment of an installation location of the power generation device including a generator that converts rotational energy of a rotating body configured of a windmill or a waterwheel into electric energy.

Solution to Problem (1) A control device for a power generation device according to this disclosure is a control device for a power generation device including a generator that converts rotational energy of a rotating body configured of a windmill or a waterwheel into electric energy, the control device including: a power converter that converts an output power of the generator into a power to be supplied to a power supply target; a storage that stores a reference map defining a relationship between an input voltage from the generator and an output power of the power converter, and a controller that controls the power converter to output a power according to the input voltage in accordance with the reference map. The controller is configured to be capable of executing correction control in which the input voltage at which the output power of the power converter is maximized is searched for and the reference map is corrected on the basis of a result of the search.

(2) Preferably, the controller does not execute the correction control in a case where a condition is not satisfied.

(3) Preferably, the condition is satisfied in a case where a user operation is performed to the control device.

(4) Preferably, the condition is satisfied in a case where (i) a threshold time has elapsed since the correction control was executed last time, (ii) a flow rate of a fluid that gives the rotational energy to the rotating body is less than or equal to a threshold flow rate, and (iii) a rotational speed of the generator is less than or equal to a threshold rotational speed.

(5) Preferably, the controller ends the correction control in a case where the flow rate of the fluid that gives the rotational energy to the rotating body has exceeded a threshold value for suppressing excessive rotation of the rotating body during execution of the correction control.

(6) Preferably, the power generation device further includes a brake device that suppresses the rotational speed of the rotating body. The controller activates the brake device in a case where the flow rate of the fluid that gives the rotational energy to the rotating body has exceeded a threshold value for suppressing excessive rotation of the rotating body during execution of the correction control.

(7) Preferably, in the correction control, the controller executes search for the input voltage at which the output power of the power converter is maximized a plurality of times, and corrects the reference map on the basis of an average value of search results.

(8) A control device for a power generation device according to this disclosure is a control device for a power generation device including a generator that converts rotational energy of a rotating body configured of a windmill or a waterwheel into electric energy, the control device including: a power converter that converts an output power of the generator into a power to be supplied to a power supply target; a storage that stores a reference map defining a reference operating point of the power generation device for each flow rate of a fluid giving the rotational energy to the rotating body; and a controller that controls the power converter to operate the power generation device at the reference operating point. The controller is configured to be capable of executing correction control in which for each of the flow rate of the fluid, an operating point of the power generation device at which the output power of the power converter is maximized is searched for, and the reference operating point is corrected on the basis of a result of the search.

(9) Preferably, the controller does not execute the correction control in a case where a condition is not satisfied.

(10) Preferably, the controller ends the correction control in a case where the flow rate of the fluid has exceeded a threshold value for suppressing excessive rotation of the rotating body during execution of the correction control.

Advantageous Effects of Invention

According to the control device according to the present invention, there can be provided a control device capable of controlling a power generation device to exhibit maximum efficiency in accordance with an environment of an installation location of the power generation device including a generator that converts rotational energy of a rotating body configured of a windmill or a waterwheel into electric energy.

BRIEF DESCRIPTION OF DRAWINGS

FIG. 9 is a flowchart illustrating a procedure of processing executed by the CPU of the control device in normal control according to a second embodiment.

DESCRIPTION OF EMBODIMENTS

Figure 1:
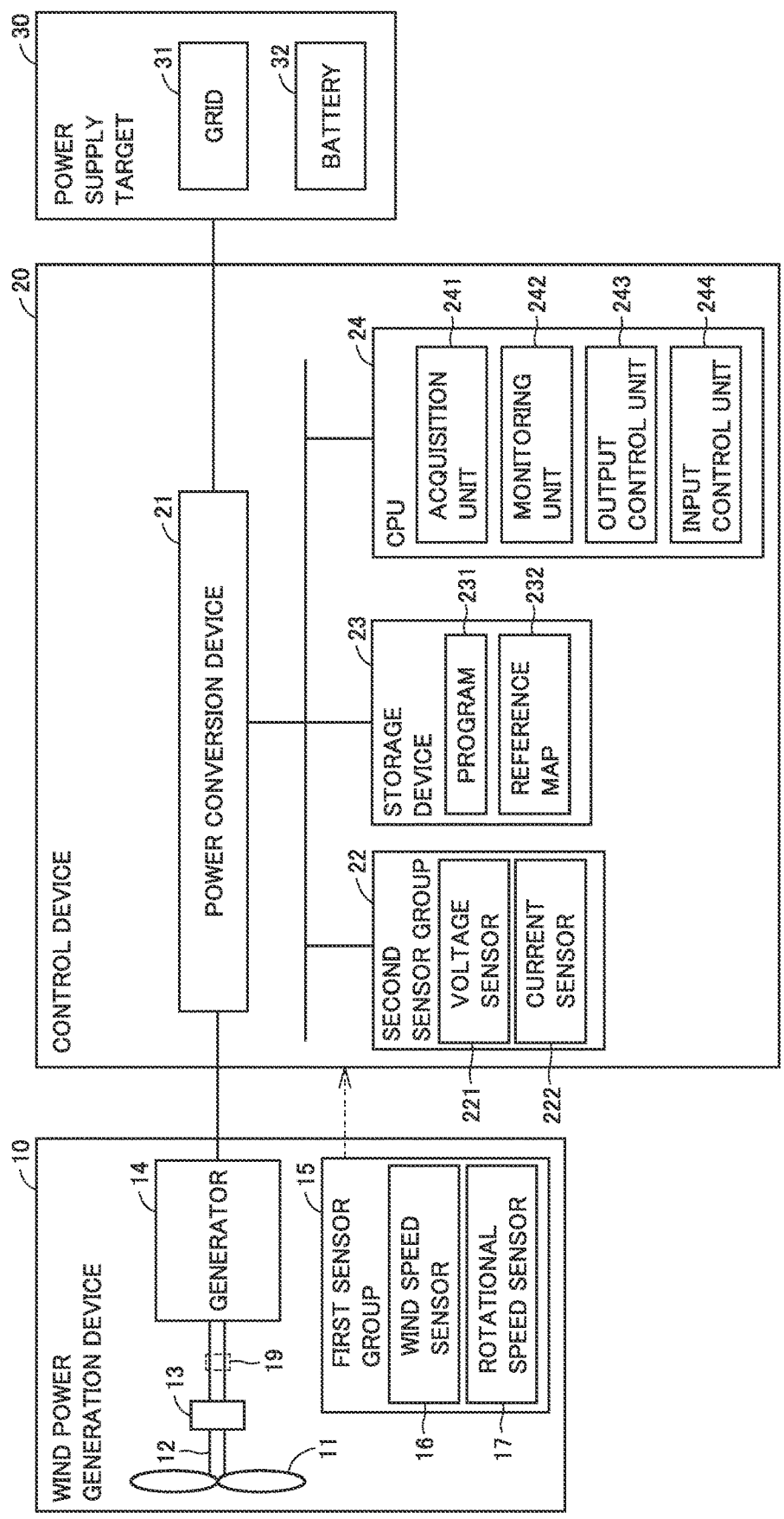
FIG. 1 is a block diagram illustrating a configuration example of a power generation system according to an embodiment.

Hereinafter, referring to the drawings, embodiments of the present invention will be described in detail. Note that in figures, the same or corresponding parts are denoted by the same reference signs, and description thereof will not be repeated.

First Embodiment

<Overall Configuration of Power Generation System>

FIG. 1 is a block diagram illustrating a configuration example of a power generation system 1 according to a first embodiment. Power generation system 1 includes a wind power generation device 10 and a control device 20. In power generation system 1 according to the first embodiment, control device 20 performs power conversion to a power generated by wind power generation device 10, and supplies the converted power to a power supply target 30.

<<Configuration of Wind Power Generation Device>>

Wind power generation device 10 includes a windmill 11, a main shaft 12, a speed increasing gear 13, a generator 14, and a first sensor group 15. Windmill 11 is, for example, a horizontal axis windmill. Windmill 11 is provided at a tip of main shaft 12 and converts wind energy into rotational energy. Specifically, windmill 11 converts a wind power into a rotational torque and transmits the rotational torque to main shaft 12. Note that windmill 11 may be a vertical axis windmill.

Main shaft 12 is connected to an input shaft of the speed increasing gear and is rotatably supported by a main bearing not illustrated. Main shaft 12 transmits the rotational torque from windmill 11 to the input shaft of speed increasing gear 13.

Speed increasing gear 13 is provided between main shaft 12 and generator 14. Speed increasing gear 13 increases a rotational speed of main shaft 12 and outputs the increased rotational speed to generator 14. As an example, speed increasing gear 13 is configured of a gear speed increasing mechanism including a planetary gear, an intermediate shaft, a high-speed shaft, and the like.

Generator 14 is connected to an output shaft of speed increasing gear 13. Generator 14 is configured of, for example, an induction generator, and generates an electric power by the rotational torque received from speed increasing gear 13. That is, generator 14 converts the rotational energy of windmill 11 into electric energy.

First sensor group 15 includes a wind speed sensor 16 and a rotational speed sensor 17. Wind speed sensor 16 detects a wind speed at a location where wind power generation device 10 is installed. Rotational speed sensor 17 detects the rotational speed of windmill 11 (rotational speed of main shaft 12). Each sensor of first sensor group 15 outputs a detection result to control device 20.

<<Configuration of Control Device and Power Supply Target>>

Control device 20 includes a power conversion device 21, a second sensor group 22, a storage device 23, and a central processing unit (CPU) 24.

Power conversion device 21 performs power conversion to the power output from generator 14 of wind power generation device 10 and outputs the power to power supply target 30. Power supply target 30 includes a grid 31 and a battery 32. That is, the power input from wind power generation device 10 to control device 20 is converted into a power corresponding to each of grid 31 and battery 32 by power conversion device 21, and is supplied to grid 31 and battery 32.

Battery 32 includes a plurality of stacked batteries. The battery is, for example, a secondary battery such as a nickel hydrogen battery or a lithium ion battery. Moreover, the battery may be a battery having a liquid electrolyte between a positive electrode and a negative electrode, or may be a battery having a solid electrolyte (all-solid battery). In addition, battery 32 includes a charger that converts the power supplied from control device 20 into a charging power for charging the battery.

Power conversion device 21 includes, for example, a converter, an inverter (neither is illustrated), and the like. The converter converts an AC power output from generator 14 into a DC power and outputs the DC power to the inverter. The inverter converts the DC power received from the converter into an AC power of a predetermined voltage and a predetermined frequency, and outputs the AC power to power supply target 30.

Second sensor group 22 includes a voltage sensor 221 and a current sensor 222. Voltage sensor 221 is configured to be able to detect a voltage of the power received from generator 14. Current sensor 222 is configured to be able to detect a current of the power received from generator 14. Voltage sensor 221 and current sensor 222 output detection results to CPU 24.

Storage device 23 includes, for example, a read only memory (ROM), a random access memory (RAM), and the like. Storage device 23 stores various programs 231 that are executed by CPU 24.

Moreover, a reference map 232 is stored in storage device 23. Reference map 232 is a map indicating a relationship between an input voltage to control device 20 (power conversion device 21) and an output power from control device 20 (power conversion device 21). Reference map 232 indicates a theoretical (experimental) maximum output power of control device 20 with respect to the input voltage to the control device. For example, reference map 232 is generated on the basis of a test result, simulation, or the like at an arbitrary observation point, and is stored in storage device 23. Details of reference map 232 will be described later with reference to FIG. 2.

CPU 24 controls each of the devices in control device 20 by executing various programs 231 stored in storage device 23. When controlling each of the devices in control device 20, CPU 24 uses, for example, inputs from first sensor group 15, second sensor group 22, and the like. Note that the control performed by CPU 24 is not limited to processing by software, and can be constructed and processed by dedicated hardware (electronic circuit).

CPU 24 functions as an acquisition unit 241, a monitoring unit 242, an output control unit 243, and an input control unit 244 by executing various programs 231.

Acquisition unit 241 acquires the detection results from first sensor group 15 and second sensor group 22. Acquisition unit 241 outputs the acquired detection results to monitoring unit 242.

Monitoring unit 242 monitors a state of power generation system 1 on the basis of the detection results received from acquisition unit 241. Monitoring unit 242 monitors, for example, the wind speed and the rotational speed of windmill 11 on the basis of the detection results of first sensor group 15. Monitoring unit 242 monitors, for example, a state of generator 14 on the basis of the detection results of second sensor group 22. In addition, monitoring unit 242 monitors whether or not a start condition and an end condition described later are satisfied. Monitoring unit 242 outputs monitoring results to output control unit 243 and input control unit 244.

Input control unit 244 controls the state of generator 14 by controlling power conversion device 21. Specifically, input control unit 244 can control the state of generator 14 by controlling power conversion device 21 to increase or decrease a load applied to generator 14.

Output control unit 243 controls power conversion device 21 to supply desired power to power supply target 30. Output control unit 243, for example, controls power conversion device 21 to convert the power from generator 14 into an AC power of a predetermined voltage and a predetermined frequency, and outputs the desired power to grid 31. Reference map 232 described above is used to control power conversion device 21. Output control unit 243 controls the output power of power conversion device 21 in accordance with an input voltage (detection value of voltage sensor 221) and reference map 232 stored in storage device 23. Note that, hereinafter, the control of power conversion device 21 according to reference map 232 is also referred to as "normal control". This will be specifically described with reference to FIGS. 1 and 2

<Normal Control>

Figure 2:
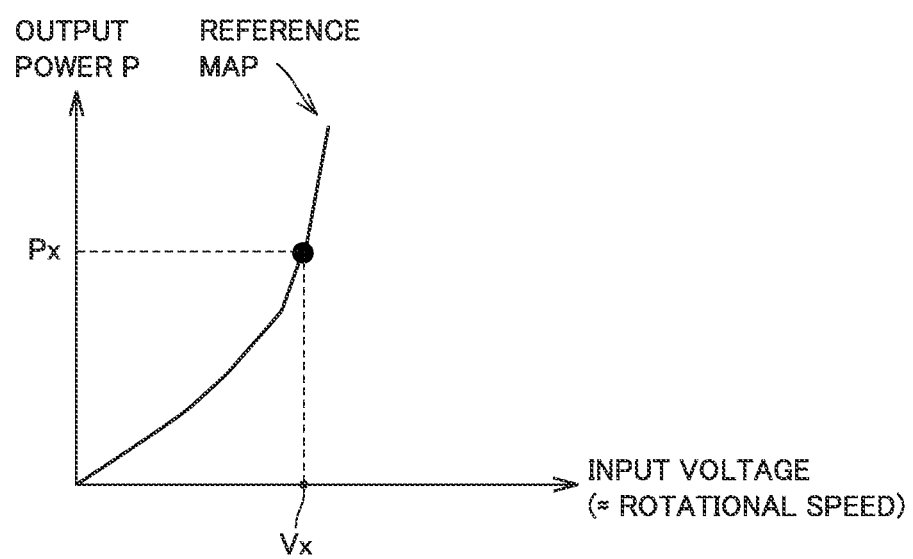
FIG. 2 is a diagram illustrating one example of a reference map.

FIG. 2 is a diagram illustrating one example of reference map 232. A horizontal axis of FIG. 2 indicates an output voltage of generator 14, that is, the input voltage to control device 20. Note that the output voltage of generator 14 can be regarded as the rotational speed of generator 14. Output power P of control device 20 is illustrated on a vertical axis of FIG. 2.

When the wind rotates windmill 11, a voltage corresponding to the rotational speed is output from generator 14. CPU 24 acquires the output voltage of generator 14, that is, the input voltage to control device 20 from voltage sensor 221. CPU 24 collates the input voltage acquired from voltage sensor 221 with reference map 232 to obtain output power P of control device 20. CPU 24 controls power conversion device 21 to output output power P. More specifically, for example, assuming that the input voltage is Vx, CPU 24 collates an input voltage Vx with reference map 232 to obtain an output power Px. CPU 24 controls power conversion device 21 to output output power Px. As a result, power Px is supplied from control device 20 to power supply target 30. Theoretically, power generation system 1 can be operated at maximum efficiency by controlling power conversion device 21 to output the output power according to predetermined reference map 232. Note that the maximum efficiency means that the maximum output power can be taken out from power generation system 1 at a certain wind power.

Figure 3:
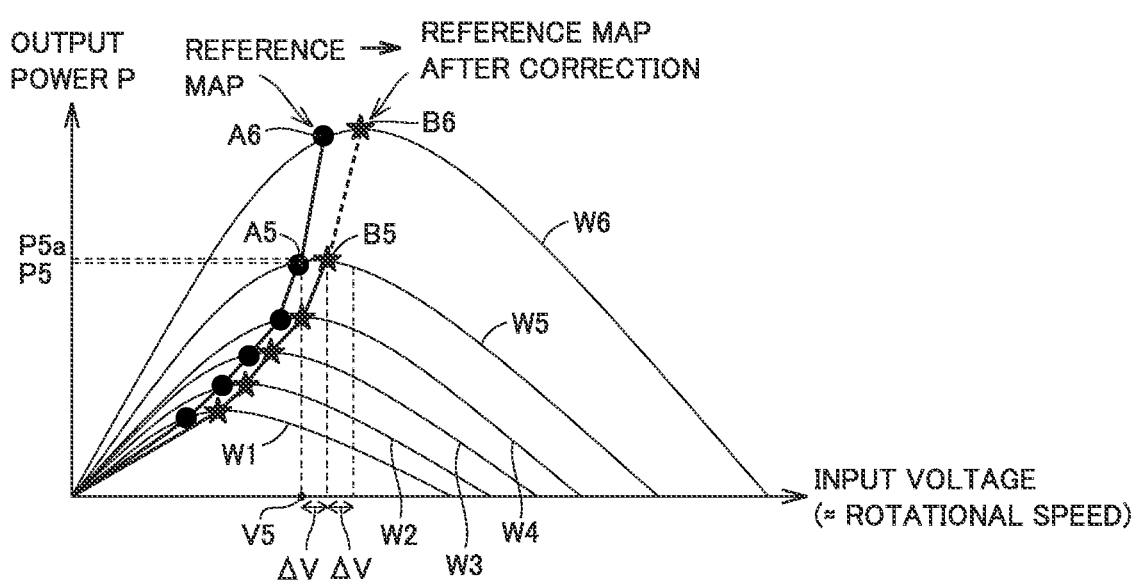
FIG. 3 is a diagram illustrating one example of output characteristics of the power generation system.

However, the output characteristics of wind power generation system 1 may vary depending on an environment of a location where wind power generation device 10 is installed. FIG. 3 is a diagram illustrating one example of the output characteristics of power generation system 1. A horizontal axis of FIG. 3 indicates the input voltage to control device 20. A vertical axis of FIG. 3 indicates output power P of control device 20.

FIG. 3 illustrates the output characteristics of power generation system 1 at six wind speeds W1 to W6. Wind speeds W1 to W6 are wind speeds representing wind speed bands WB1 to WB6, respectively (for example, mean values in the wind speed bands). The wind bands include wind speeds that becomes higher in order of wind speed band WB1<wind speed band WB2<wind speed band WB3<wind speed band WB4<wind speed band WB5<wind speed band WB6 That is, the wind speed becomes higher in order of wind speed W1<wind speed W2<wind speed W3<wind speed W4<wind speed W5<wind speed W6.

Here, for example, it is assumed that the current wind speed is a wind speed included in wind speed band WB5. For example, assuming that the input voltage at this time is V5, control device 20 controls each of the units to operate at an operating point A5 in accordance with reference map 232, and outputs output power P5. However, when the wind speed is a wind speed included in wind speed band WB5, the operating point (hereinafter also referred to as a "maximum efficiency point") at which power generation system 1 is operated at the maximum efficiency is an operating point B5. When generator 14 is operated at operating point B5 rather than operating point A5, a larger output power can be taken out from power generation system 1 (P5<P5*a*). As described above, reference map 232 is generated on the basis of a test result, simulation, or the like at an arbitrary observation point. Therefore, although it is difficult to assume that the operating point largely deviates from the maximum efficiency point, depending on an environment of a location where wind power generation device 10 is installed, there may be an operating point at which the efficiency can be higher than an operating point according to reference map 232. Power generation system 1 is desirably operated at the maximum efficiency point.

<Correction Control>

Figure 4:
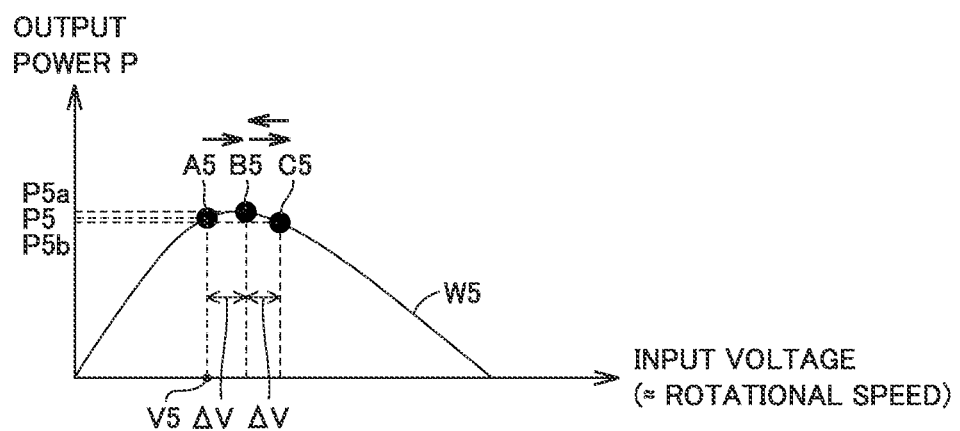
FIG. 4 is a diagram for describing MPPT control.

Therefore, control device 20 according to the first embodiment executes correction control for correcting reference map 232 when the start condition (described later) is satisfied. The correction control is control of searching for a maximum efficiency point at which a maximum output power can be taken out from power generation system 1 for each output voltage of generator 14 by maximum power point tracking (MPPT) control, and correcting reference map 232 to the searched maximum efficiency point. Referring to FIG. 4, a specific example of the MPPT control will be described.

FIG. 4 is a diagram for describing the MPPT control. In FIG. 4, the output characteristics of power generation system 1 at wind speed W5 in FIG. 3 are picked up and illustrated. It is assumed that the input voltage to control device 20 is V5 in the normal control before the start condition for starting the MPPT control is satisfied. In this case, control device 20 controls power conversion device 21 to output output power P5 in accordance with reference map 232. That is, power generation system 1 is operated at operating point A5. Hereinafter, the operating point determined in accordance with reference map 232 is also referred to as a "reference operating point".

When the start condition is satisfied, control device 20 starts the MPPT control, increases or decreases the output voltage of generator 14 (input voltage to control device 20) from voltage V5 by a predetermined voltage $\Delta V$, and searches for an operating point at which the output power of power generation system 1 exceeds the maximum efficiency point. In the example of FIG. 4, control device 20 starts the MPPT control when the start condition is satisfied, and controls power conversion device 21 to increase the output voltage of generator 14 (input voltage to control device 20) from voltage V5 by predetermined voltage $\Delta V$. That is, control device 20 controls power conversion device 21 such that power generation system 1 operates at operating point B5 (voltage V5+$\Delta V$). Control device 20 controls, for example, power conversion device 21 to adjust the load and controls the output voltage of generator 14. Control device 20 calculates output power P5a of power generation system 1 at this time on the basis of the detection results of second sensor group 22 (voltage sensor 221 and current sensor 222).

Control device 20 compares output power P5a with output power P5 of power generation system 1 when power generation system 1 is operated at reference operating point A5. Since output power P5a is larger than output power P5, control device 20 further increases the output voltage of generator 14 by predetermined voltage $\Delta V$ and continues the search for the maximum efficiency point. That is, control device 20 controls power conversion device 21 such that power generation system 1 operates at an operating point C5 (voltage V5+2$\Delta V$).

Control device 20 calculates an output power P5b of power generation system 1 when power generation system 1 is operated at operating point C5. Control device 20 compares output power P5b with output power P5a. Since output power P5b is smaller than output power P5a, control device 20 decreases the output voltage of generator 14 from operating point C5 by predetermined voltage $\Delta V$. That is, the operating point is set to operating point B5. Control device 20 determines the operating point at which the maximum output power can be taken out from power generation system 1 to be operating point B5, and maintains setting of the load such that power generation system 1 operates at operating point B5, that is, the output voltage of generator 14 is maintained.

Referring again to FIG. 3, upon determining the maximum efficiency point at which the maximum output power can be taken out from generator 14, control device 20 corrects reference map 232. Specifically, control device 20 corrects the operating point at wind speed W5 from reference operating point A5 to operating point B5. The reference map is corrected by, for example, linear interpolation on the basis of a correction amount from operating point A5 to operating point B5. When reference map 232 is represented by a formula, the formula may be corrected on the basis of the correction amount. As a result, the reference map after correction may be obtained.

Power generation system 1 is controlled on the basis of corrected reference map 232, which allows power generation system 1 to exhibit the maximum efficiency.

In the first embodiment, since reference map 232 as a base exists, the maximum efficiency point (operating point) at which the efficiency of power generation system 1 is maximized can be searched for early as compared with a case where reference map 232 as a base does not exist, and the correction control can be completed early. Therefore, the predetermined voltage $\Delta V$ is set small, and search accuracy of the maximum efficiency point can be improved. Even when predetermined voltage $\Delta V$ is set small, the correction control can be completed without requiring an excessive time Specifically, in the case where reference map 232 as a base does not exist, it is necessary to perform the entire search in order to search for the maximum efficiency point, and it is necessary to set predetermined voltage $\Delta V$ described above, which is an operation amount per one time, to be large. This is because if predetermined voltage $\Delta V$ is set small in the entire search, when there is a change in the wind speed, the wind speed cannot follow the change, so that there is a possibility of causing excessive rotation of windmill 11. When predetermined voltage $\Delta V$ is set large, the search accuracy of the operating point at which the maximum efficiency is obtained is lowered. In the first embodiment, reference map 232 serving as a base is stored in storage device 23 of control device 20. Since it is assumed that the reference operating point of the reference map, and the maximum efficiency point do not greatly deviate from each other, by searching for the maximum efficiency point with the reference operating point serving as a base as described above, a so-called search range of the operating point (change range of the voltage of generator 14) can be limited. Limiting the search range allows predetermined voltage $\Delta V$ to be set small. This can improve the search accuracy of the maximum efficiency point.

<Start Condition>

Next, the start condition of the correction control will be described. As the start condition, a first start condition and a second start condition described below can be applied. The start condition may be satisfied when the first start condition is satisfied, the start condition may be satisfied when both the first start condition and the second start condition are satisfied, or the start condition may be satisfied when either the first start condition or the second start condition is satisfied.

The first start condition is that a user has operated control device 20 (specifically, for example, an operation unit not illustrated).

The second start condition is that a threshold time has elapsed since the previous correction control was executed, the wind speed is equal to or less than the threshold wind speed, and the rotational speed of generator 14 is less than or equal to a threshold rotational speed. The threshold time is a time that can be appropriately set in accordance with the environment or the like of the location where wind power generation device 10 is installed. The threshold wind speed is a threshold value for restraining windmill 11 from reaching excessive rotation. The threshold wind speed may be set to, for example, an upper limit value of wind speed band WB6 The threshold rotational speed is a threshold value for confirming that generator 14 (windmill 11) does not reach the excessive rotation.

For example, a timer not illustrated that is included in control device 20 is used for an elapsed time from the previous execution of the correction control. When the correction control ends and the control shifts to the normal control, the timer is activated by CPU 24.

The detection result of wind speed sensor 16 is used as the wind speed to be compared with the threshold wind speed. The rotational speed of generator 14 to be compared to the threshold rotational speed is calculated on the basis of the output voltage of generator 14 detected by voltage sensor 221. Alternatively, the rotational speed of generator 14 to be compared with the threshold rotational speed may be calculated on the basis of the rotational speed of windmill 11 (main shaft 12) detected by rotational speed sensor 17.

<End Condition>

Next, the end condition of the correction control will be described. As the end condition, a first end condition and/or a second end condition described below can be applied. Alternatively, a third end condition to a fifth end condition may be appropriately combined with the first end condition and/or the second end condition.

The first end condition is that a preset set time has elapsed since the correction control was executed, and a number of times of the correction of reference map 232 has reached a preset set number of times. The set time is a time that can be appropriately set. As the set time, a time when at least one correction control can be completed is set. The set number of times is appropriately set to be greater than or equal to one.

The second end condition is that the wind speed band including the wind speed has changed and a rotational acceleration of windmill 11 has exceeded a threshold acceleration. The change in the wind speed band means that, for example, when the wind speed at the start of the correction control is included in wind speed band WB5, the wind speed has changed to the wind speed included in the other wind speed band (WB1 to WB4, WB6). The threshold acceleration is a threshold value for restraining windmill 11 from reaching excessive rotation. The rotational acceleration of windmill 11 can be calculated on the basis of, for example, the detection value of rotational speed sensor 17 or the detection value of voltage sensor 221.

The third end condition is that an average wind speed has exceeded a threshold wind speed. The fourth end condition is that the rotational speed of generator 14 has exceeded a threshold rotational speed. The fifth end condition is that the output power from wind power generation device 10 (input power to control device 20) has exceeded a rated power. The third end condition to the fifth end condition are set in order to restrain windmill 11 from reaching excessive rotation.

<Processing Executed by Control Device (CPU)>

Figure 5:
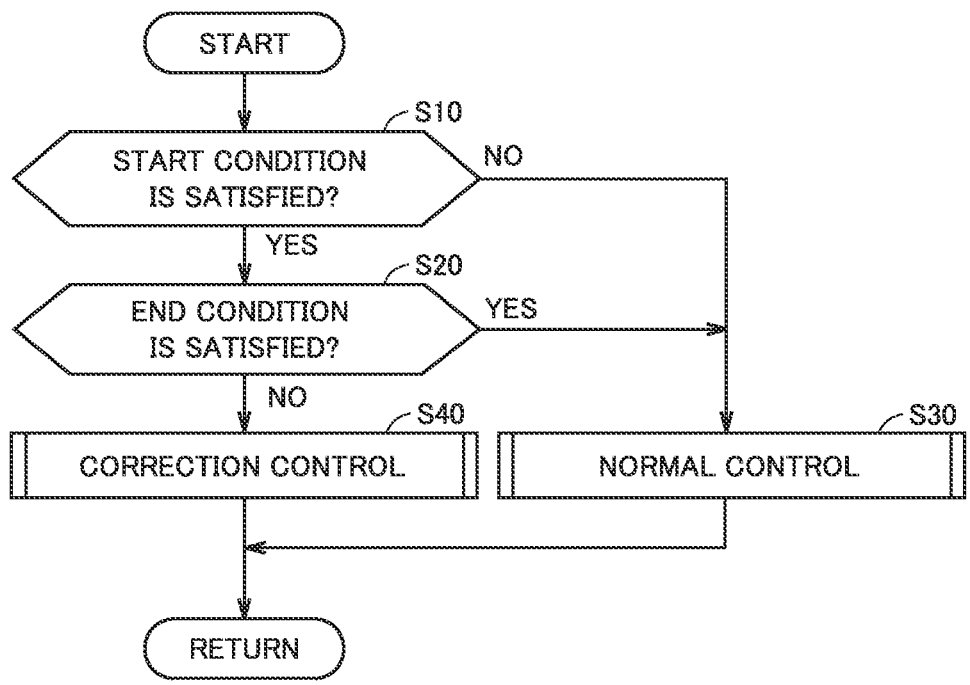
FIG. 5 is a flowchart illustrating a procedure of processing executed by a CPU of a control device.

FIG. 5 is a flowchart illustrating a procedure of processing executed by CPU 24 of control device 20. While each step (hereinafter, the step is abbreviated as "S") of the flowchart illustrated in FIG. 5 will be described in a case where it is implemented by software processing by CPU 24, a part or all of the steps may be implemented by hardware (electric circuit) manufactured in CPU 24. The processing of the flowchart in FIG. 5 is executed by CPU 24 at every predetermined control period.

CPU 24 determines whether or not the start condition is satisfied (S10). If the start condition is not satisfied (NO in S10), CPU 24 executes the normal control (S30).

On the other hand, if the start condition is satisfied (YES in S10), CPU 24 determines whether or not the end condition is satisfied (S20). If the end condition is satisfied (YES in S20), CPU 24 executes the normal control (S30). Note that if the start condition is satisfied, CPU 24 maintains the satisfaction of the start condition until the end condition is satisfied.

If the end condition is not satisfied (NO in S20), CPU 24 executes correction control (S40).

Figure 6:
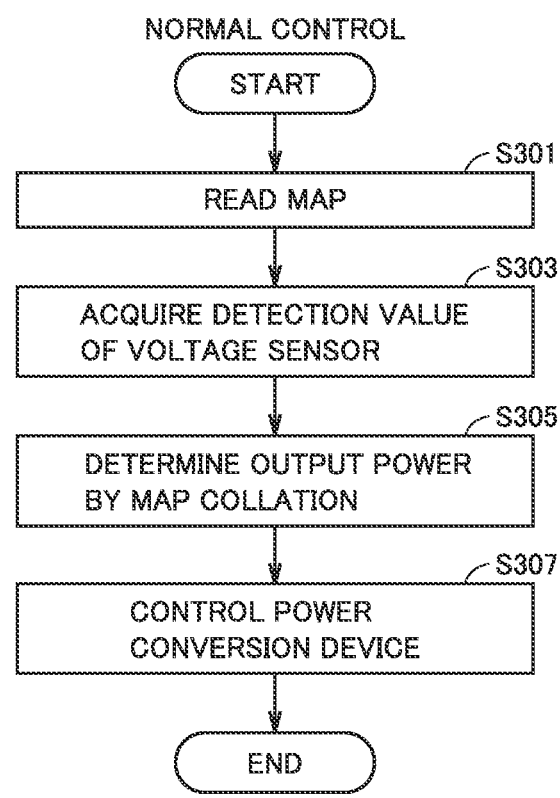
FIG. 6 is a flowchart illustrating a procedure of processing executed by the CPU of the control device in normal control.

FIG. 6 is a flowchart illustrating a procedure of processing executed by CPU 24 of control device 20 in the normal control.

CPU 24 reads reference map 232 from storage device 23 (S301). Subsequently, CPU 24 acquires the input voltage (output voltage of generator 14) to control device 20 from voltage sensor 221 of second sensor group 22 (S303). CPU 24 collates the input voltage acquired in S303 with reference map 232 read in S301 (S305). This allows CPU 24 to determine output power P of control device 20.

CPU 24 controls power conversion device 21 to output output power P determined in S305 (S307). This allows power generation system 1 to be operated at the operating point according to reference map 232.

Figure 7:
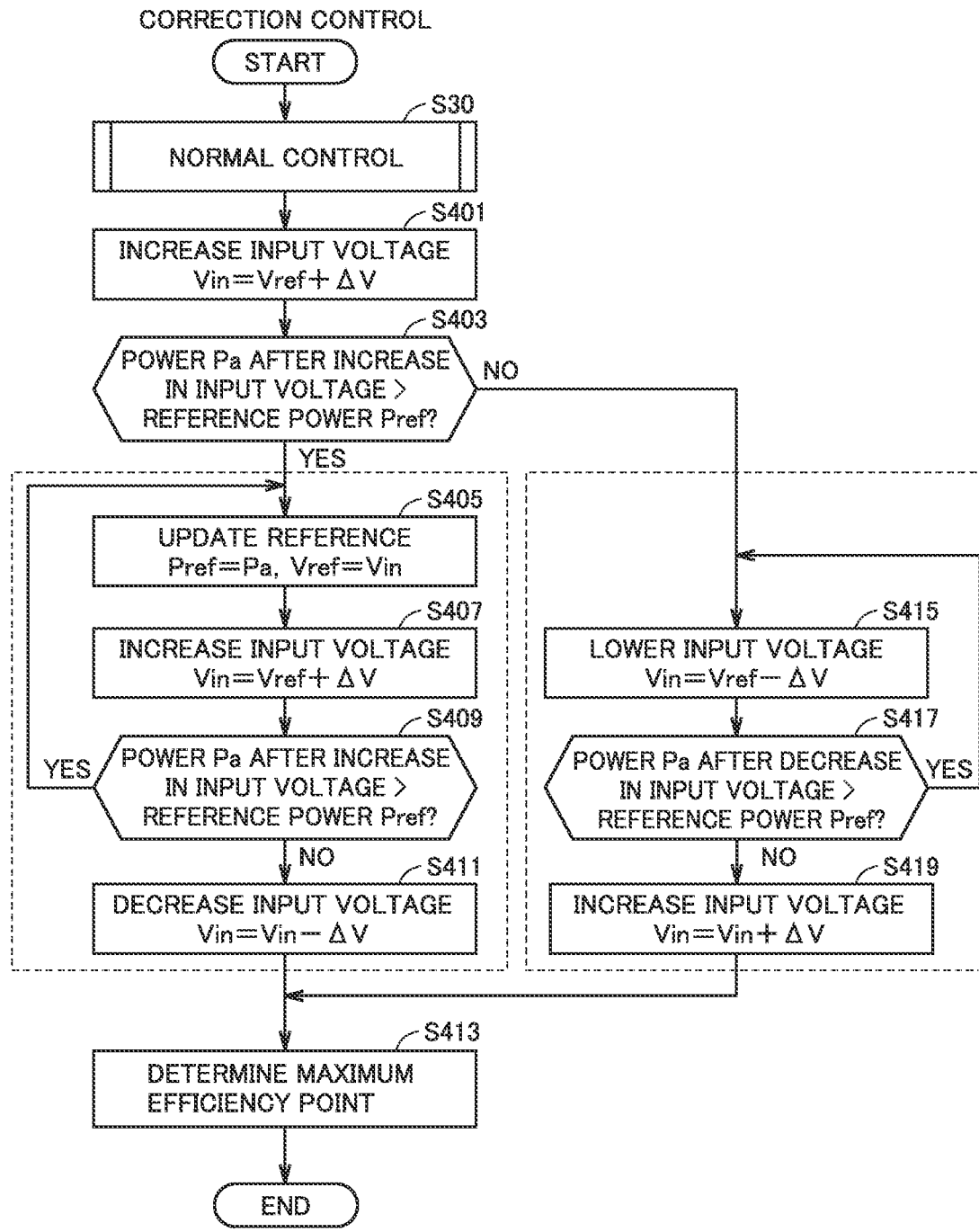
FIG. 7 is a flowchart illustrating a procedure of processing executed by the CPU of the control device in correction control.

FIG. 7 is a flowchart illustrating a procedure of processing executed by CPU 24 of control device 20 in the correction control.

First, CPU 24 executes the normal control (S30). This allows the operating point of power generation system 1 to be determined. CPU 24 executes the MPPT control with the above operating point as a start. Here, as one specific example, it is assumed that in S30, reference map 232 is read and the operating point of power generation system 1 is determined as reference operating point A5. CPU 24 sets voltage V5 at reference operating point A5 as a reference voltage Vref and sets output power P5 at reference operating point A5 as a reference power Pref (Vref=V5, Pref=P5), respectively.

CPU 24 changes the load on generator 14 such that an input voltage (output voltage of generator 14) Vin to control device 20 increases by predetermined voltage ΔV (S401). Specifically, input voltage Vin to control device 20 is changed in accordance with the following formula (1) (Vin=V5+ΔV).

$$Vin = Vref + \Delta V \quad (1)$$

CPU 24 acquires detection values (voltage and current) from second sensor group 22, and calculates an output power Pa of power generation system 1 after the increase in the input voltage. CPU 24 compares output power Pa with reference power Pref (S403).

When output power Pa is larger than reference power Pref (YES in S403), CPU 24 updates the reference (S405). Specifically, CPU 24 updates reference power Pref to power Pa and updates reference voltage Vref to voltage Vin (=V5+ΔV).

Subsequently, CPU 24 changes the operating point of power generation system 1 such that input voltage Vin to control device 20 increases by predetermined voltage ΔV (S407). That is, input voltage Vin is set to V5+2ΔV.

CPU 24 calculates output power Pa after execution of the processing in S407 and compares output power Pa with reference power Pref as in S403 (S409).

If output power Pa is larger than reference power Pref (YES in S409), CPU 24 returns the processing to S405 to continue the search for the operating point at which the output power is maximized.

On the other hand, if output power Pa is less than or equal to reference power Pref (NO in S409), CPU 24 updates the operating point of power generation system 1 such that input voltage Vin to control device 20 decreases by predetermined voltage ΔV (S411). CPU 24 maintains input voltage Vin, that is, the operating point of power generation system 1.

CPU 24 determines the operating point of power generation system 1 in S411 as the maximum efficiency point, and corrects reference map 232 (S413). By controlling power conversion device 21 in accordance with reference map 232 after the correction, the maximum output power can be taken out from power generation system 1, and power generation system 1 can exhibit the maximum efficiency.

If in step S403, output power Pa is less than or equal to reference power Pref (NO in S403), CPU 24 updates the operating point of power generation system 1 such that input voltage Vin to control device 20 decreases from reference voltage Vref by predetermined voltage ΔV (S415). Specifically, input voltage Vin to control device 20 is changed in accordance with the following formula (2) (Vin=V5−ΔV).

$$Vin = Vref - \Delta V \quad (2)$$

CPU 24 calculates output power Pa after execution of the processing in S415 and compares output power Pa with reference power Pref as in S403 (S417).

If output power Pa is larger than reference power Pref (YES in S417), CPU 24 returns the processing to S415 to continue the search for the operating point at which the output power is maximized.

On the other hand, if output power Pa is less than or equal to reference power Pref (NO in S417), CPU 24 updates the operating point of power generation system 1 such that input voltage Vin to control device 20 increases by predetermined voltage ΔV (S419). CPU 24 maintains input voltage Vin, that is, the operating point of power generation system 1.

CPU 24 determines the operating point of power generation system 1 in S419 as the maximum efficiency point, and corrects the reference map (S413) By controlling power conversion device 21 in accordance with reference map 232 after the correction, the maximum output power can be taken out from power generation system 1, and power generation system 1 can exhibit the maximum efficiency.

As described above, control device 20 according to the first embodiment controls power conversion device 21 in accordance with reference map 232 indicating the relationship between the input voltage to control device 20 and the output power from control device 20. Control device 20 executes the correction control and corrects reference map 232 so as to be optimal in accordance with the environment of the installation location of wind power generation device 10. By correcting reference map 232 in accordance with the environment of the installation location of wind power generation device 10, the maximum output power can be taken out from power generation system 1 regardless of the installation location, and power generation system 1 can exhibit the maximum efficiency.

Note that while an example in which power generation system 1 is a wind power generation system has been described above, power generation system 1 may be a hydraulic power generation system. In the case where power generation system 1 is a hydraulic power generation system, a hydraulic power generation device is applied instead of wind power generation device 10.

First Modification

In wind power generation, for example, a case is assumed in which a gust of wind occurs and the wind power increases suddenly. In such a case, it is desirable to perform control to prevent windmill 11 from reaching excessive rotation. In the correction control, as described above, the input voltage is changed by predetermined voltage ΔV at one time by the MPPT control. When the wind speed exceeding wind speed band WB6 in FIG. 3 is generated, there is a possibility that in the correction control, the control cannot cope with this, and windmill 11 reaches excessive rotation.

Therefore, control device 20 according to a first modification monitors the wind speed at the same time as the start of the correction control, and immediately ends the correction control when the wind speed exceeds a threshold value. The end of the correction control allows control device 20 to execute the normal control. While as described in the embodiment, the third end condition (that the average wind speed has exceeded the threshold wind speed) is set as the end condition of the correction control, according to the first modification, it is possible to cope with a sudden increase in wind power such as a gust of wind. The threshold value may be the same value as the threshold wind speed in the embodiment, or may be a value different from the value of the threshold wind speed.

In the normal control, control device 20 controls power generation system 1 in accordance with reference map 232 (if corrected, the reference map after the correction). Specifically, control device 20 controls power conversion device 21 in accordance with reference map 232. If the wind speed has exceeded the threshold value (for example, wind speed band WB6), control device 20 controls power conversion device 21 to operate at reference operating point A6 (if corrected, operating point B6).

As a result, even if the wind power applied to windmill 11 increases, the load applied to generator 14 is increased so as to operate at the operating point (reference operating point A6) according to reference map 232, and thus, it is possible to restrain windmill 11 from reaching excessive rotation.

Figure 8:
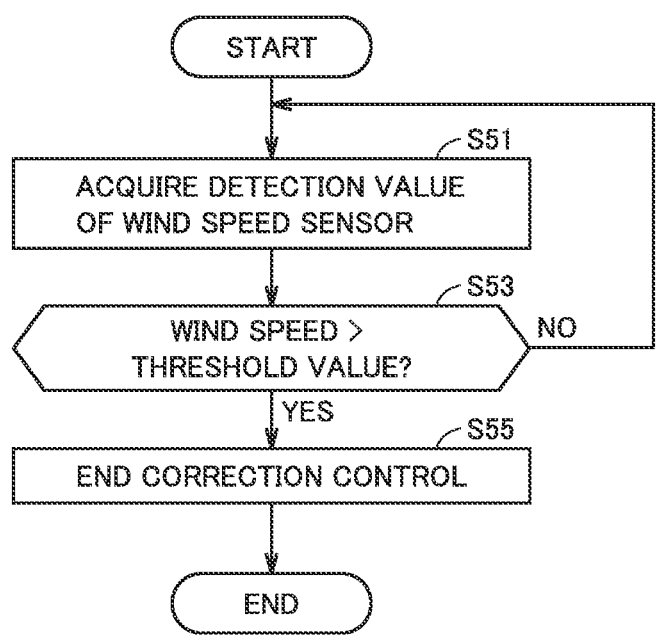
FIG. 8 is a flowchart illustrating a procedure of processing executed by the CPU of the control device according to a first modification.

FIG. 8 is a flowchart illustrating a procedure of processing executed by CPU 24 of control device 20 according to the first modification. This flowchart is started when the correction control is started.

CPU 24 acquires the detection value of wind speed sensor 16 (S51). CPU 24 compares the wind speed (current wind speed) acquired in S51 with the threshold value (S53).

If the wind speed is lower than or equal to the threshold value (NO in S53), CPU 24 returns the processing to S51 and continues the monitoring of the wind speed.

If the wind speed has exceeded the threshold value (YES in S53), CPU 24 ends the correction control (SSS). This allows CPU 24 to execute the normal control.

As described above, according to the first modification, if the wind speed has exceeded the threshold value, the correction control is immediately ended and the control is switched to the normal control. In the normal control, power generation system 1 is controlled in accordance with reference map 232. Even if the wind power applied to windmill 11 increases, the load applied to generator 14 is increased so as to operate at the operating point according to reference map 232, and thus, it is possible to restrain windmill 11 from reaching excessive rotation.

Second Modification

While in the first modification, an example has been described in which if the wind speed has exceeded the threshold value, the correction control is immediately ended, and the control is switched to the normal control to restrain windmill 11 from reaching excessive rotation. However, if the wind speed has exceeded the threshold value, windmill 11 may be restrained from reaching excessive rotation by other means.

Referring again to FIG. 1, wind power generation device 10 according to a second modification further includes a brake device 19 between speed increasing gear 13 and generator 14. Brake device 19 is, for example, a disc brake.

If the wind speed has exceeded the threshold value, control device 20 activates brake device 19 to suppress the rotation of windmill 11. This can restrain windmill 11 from reaching excessive rotation.

Third Modification

In the embodiment, an example in which the reference operating point of reference map 232 is corrected on the basis of one search result in the correction control has been described. However, the search may be performed a plurality of times, and the reference operating point of reference map 232 may be corrected on the basis of an average of search results.

For example, even if the wind speed falls within wind speed band WB5 during the execution of the correction control, the winds peed may fluctuate within the wind speed band WB5. Then, the operating point at which the efficiency of wind power generation device 10 can be maximized may be changed.

Therefore, the search is executed a plurality of times, and an average value of the output voltages of generator 14 at which output power P of wind power generation device 10 is maximized is calculated. On the basis of this average value, the operating point of generator 14 is determined. The reference operating point is corrected to the above-described operating point. This can improve accuracy of the correction of reference map 232.

Second Embodiment

In the normal control in the first embodiment, the operating point is determined on the basis of the input voltage to control device 20 without considering the wind speed at that time. Specifically, the input voltage to control device 20 is collated with reference map 232 to determine the output power of control device 20. However, in the normal control, the operating point may be determined in consideration of the wind speed. Note that a configuration of a power generation system according to a second embodiment is similar to that of the first embodiment, and thus, a description thereof will not be repeated.

Referring again to FIG. 3, control device 20 (CPU 24) according to the second embodiment determines an intersection between reference map 232 and each of the wind speeds (W1 to W6) as a reference operating point of power generation system 1 at each of the wind speeds. That is, in the second embodiment, the reference operating point is determined for each of the wind speeds. For example, the operating points such as A5, A6 represented by the intersections between reference map 232 and the respective wind speeds in FIG. 3 are determined as the reference operating points of power generation system 1. In other words, in the second embodiment, the operating point of power generation system 1 is determined in according to the wind speed.

In the second embodiment, the reference operating point of power generation system 1 is determined for each of the wind speeds. Therefore, in the MPPT control, the search for the maximum efficiency point can be started from the reference operating point determined for each of the wind speeds. It is assumed that the reference operating point and the maximum operating point do not greatly deviate from each other, and the maximum efficiency point of power generation system 1 can be searched for earlier and the correction control can be completed earlier as compared with the first embodiment in which the operating point is determined on the basis of the input voltage to control device 20.

FIG. 9 is a flowchart illustrating a procedure of processing executed by CPU 24 of control device 20 in normal control according to the second embodiment.

CPU 24 reads reference map 232 from storage device 23 (S311). Subsequently, CPU 24 acquires a current wind speed from wind speed sensor 16 of first sensor group 15 (S313). CPU 24 collates the wind speed acquired in S313 with reference map 232 read in S311 (S315). This allows CPU 24 to determine the operating point of power generation system 1.

CPU 24 controls power conversion device 21 such that power generation system 1 operates at the operating point determined in S315 (S317). This allows power generation system 1 to be operated at the operating point according to reference map 232.

In the MPPT control, the maximum efficiency point of power generation system 1 can be searched for earlier by starting the search for the maximum efficiency point from the operating point determined as described above.

In the second embodiment, upon determining the maximum efficiency point at a certain wind speed, control device 20 corrects the reference operating point at the wind speed. Specifically, referring to FIG. 3, for example, when the current wind speed is wind speed W5, reference operating point A5 is corrected to B5. Control device 20 similarly corrects the reference operating point at each of the other wind speeds by the correction control when the wind at the wind speed occurs. Note that when the reference operating point at a certain wind speed is corrected, the other reference operating points may be corrected by a method described in a fourth modification below.

Fourth Modification

Depending on the wind speed band, frequency of occurrence of the wind at the relevant wind speed included in the wind speed band may be low. Typically, it is wind speed band WB6, which is a high wind speed band. If wind having the wind speed included in wind speed band WB6 does not occur, the correction control for wind speed band WB6 cannot be executed, and reference map 232 (specifically, the reference operating point of wind speed W6) cannot be corrected.

Therefore, for the operating point of the wind speed band (wind speed band WB6) that is expected to occur less frequently, the reference operating point in wind speed band WB6 may be corrected on the basis of a result of the correction control (corrected reference operating point) of the other wind speed band (for example, wind speed band WB5) and a relationship between the reference operating point of wind speed band WB5 and the reference operating point of wind speed band WB6 derived from initial (theoretical) reference map 232. For example, when reference map 232 is generated, if reference map 232 is formulated, it is possible to correct the reference operating point of the wind speed band whose occurrence frequency is expected to be low by using the corrected reference operating point of the other wind speed band.

For example, wind speed band WB6 is set in advance as a wind speed band to be corrected by a mathematical formula. When the reference operating point of any of the wind speed bands other than wind speed band WB6 is corrected, the reference operating point of wind speed band WB6 can be corrected by using the corrected operating point and the mathematical formula. Note that the reference operating point of wind speed band WB6 may be corrected by using a plurality of corrected reference operating points and a mathematical formula.

It should be considered that the embodiments disclosed this time are examples in all respects and are not restrictive. The scope of the present invention is defined not by the description above but by the claims, and it is intended that all modifications within meaning and scope equivalent to the claims are included.

REFERENCE SIGNS LIST

1: power generation system, 10: wind power generation device, 11: windmill, 12: main shaft, 13: speed increasing gear, 14: generator, 15: first sensor group, 16: wind speed sensor, 17: rotational speed sensor, 19 brake device, 20 control device, 21: power conversion device, 22: second sensor group, 23 storage device, 24: CPU, 30: power supply target, 31: grid, 32: battery, 221: voltage sensor, 222: current sensor, 231: program, 232: reference map, 241: acquisition unit, 242: monitoring unit, 243: output control unit, 244: input control unit

The invention claimed is:

1. A control device for a power generation device including a generator that converts rotational energy of a rotating body configured of a windmill or a waterwheel into electric energy, the control device comprising:
a power converter configured to convert an output power of the generator into a power to be supplied to a power supply target;
a storage that stores a reference map defining a relationship between an input voltage from the generator and an output power of the power converter; and
a controller configured to control the power converter to output a power according to the input voltage in accordance with the reference map, wherein
the controller is configured to execute correction control in which (i) a search for the input voltage at which the output power of the power converter is maximized is started from an operating point according to the reference map, (ii) the operating point according to the reference map is corrected based on a result of the search for the input voltage, and (iii) the reference map is corrected based on a correction amount of the operating point.

2. The control device for the power generation device according to claim 1, wherein the controller does not execute the correction control in a case where a condition is not satisfied.

3. The control device for the power generation device according to claim 2, wherein the condition is satisfied in a case where a user operation is performed to the control device.

4. The control device for the power generation device according to claim 2, wherein the condition is satisfied in a case where (i) a threshold time has elapsed since the correction control was executed last time, (ii) a flow rate of a fluid that gives the rotational energy to the rotating body is less than or equal to a threshold flow rate, and (iii) a rotational speed of the generator is less than or equal to a threshold rotational speed.

5. The control device for the power generation device according to claim 1, wherein the controller ends the correction control in a case where a flow rate of a fluid that gives the rotational energy to the rotating body has exceeded a threshold value for suppressing excessive rotation of the rotating body during execution of the correction control.

6. The control device for the power generation device according to claim 1, wherein
the power generation device further includes a brake device that suppresses the rotational speed of the rotating body, and
the controller activates the brake device in a case where a flow rate of a fluid that gives the rotational energy to the rotating body has exceeded a threshold value for suppressing excessive rotation of the rotating body during execution of the correction control.

7. The control device for the power generation device according to claim 1, wherein in the correction control, the controller executes search for the input voltage at which the output power of the power converter is maximized a plurality of times, and corrects the reference map on the basis of an average value of search results.

8. A control device for a power generation device including a generator that converts rotational energy of a rotating body configured of a windmill or a waterwheel into electric energy, the control device comprising:
a power converter configured to convert an output power of the generator into a power to be supplied to a power supply target;
a storage that stores a reference map defining a reference operating point of the power generation device for each flow rate of a fluid giving the rotational energy to the rotating body; and
a controller configured to control the power converter to operate the power generation device at the reference operating point, wherein
the controller is configured to execute correction control in which for each of the flow rate of the fluid, (i) a search for an operating point of the power generation device at which the output power of the power converter is maximized is started from the reference operating point corresponding to the flow rate, and (ii) the reference operating point corresponding to the flow rate is corrected based on a result of the search for the operating point.

9. The control device for the power generation device according to claim 8, wherein the controller does not execute the correction control in a case where a condition is not satisfied.

10. The control device for the power generation device according to claim 8, wherein the controller ends the correction control in a case where the flow rate of the fluid has exceeded a threshold value for suppressing excessive rotation of the rotating body during execution of the correction control.

\* \* \* \* \*